US008373617B2

(12) United States Patent
Kim et al.

(10) Patent No.: US 8,373,617 B2
(45) Date of Patent: Feb. 12, 2013

(54) BARRIER DEVICE AND STEREOSCOPIC IMAGE DISPLAY USING THE SAME

(75) Inventors: Beom-Shik Kim, Suwon-si (KR);
Jang-Doo Lee, Suwon-si (KR);
Hyoung-Wook Jang, Suwon-si (KR);
Hui Nam, Suwon-si (KR);
Myoung-Seop Song, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 828 days.

(21) Appl. No.: 11/274,831

(22) Filed: Nov. 14, 2005

(65) Prior Publication Data

US 2006/0126177 A1    Jun. 15, 2006

(30) Foreign Application Priority Data

Nov. 30, 2004   (KR) .................. 10-2004-0098978

(51) Int. Cl.
*G09G 5/00* (2006.01)
(52) U.S. Cl. ............................................. 345/6
(58) Field of Classification Search ............. 348/42, 348/51; 359/462; 345/6
See application file for complete search history.

(56) References Cited

U.S. PATENT DOCUMENTS

| | | | | |
|---|---|---|---|---|
| 5,067,167 A * | 11/1991 | Berger | ............................ | 345/419 |
| 5,315,377 A * | 5/1994 | Isono et al. | ...................... | 348/51 |
| 5,825,541 A | 10/1998 | Imai | | |
| 5,949,390 A | 9/1999 | Nomura et al. | | |
| 6,108,029 A * | 8/2000 | Lo | .................................. | 348/43 |
| 6,649,914 B1 | 11/2003 | Moorman et al. | | |
| 2002/0024592 A1 | 2/2002 | Uomori et al. | | |
| 2002/0114072 A1 | 8/2002 | Hong | | |
| 2003/0025659 A1 | 2/2003 | Kondo et al. | | |
| 2003/0067539 A1 | 4/2003 | Doerfel et al. | | |
| 2003/0203747 A1 * | 10/2003 | Nagamine | .................. | 455/575.3 |
| 2006/0152812 A1 * | 7/2006 | Woodgate et al. | ............ | 359/619 |

FOREIGN PATENT DOCUMENTS

| | | |
|---|---|---|
| DE | 200 22 456 U1 | 11/2001 |
| EP | 0 833 183 A1 | 4/1998 |
| EP | 1 357 726 A1 | 10/2003 |
| JP | 03-119889 | 5/1991 |
| JP | 4-250439 | 9/1992 |
| JP | 8-327948 | 12/1996 |

(Continued)

OTHER PUBLICATIONS

Patent Abstracts of Japan, Publication No. 10-142572, dated May 29, 1998, in the name of Jonathan Harrold et al.

(Continued)

*Primary Examiner* — Kevin M Nguyen
(74) *Attorney, Agent, or Firm* — Christie, Parker & Hale, LLP

(57) ABSTRACT

The present invention relates to a stereoscopic image display device including an active barrier for varying a barrier display pattern so as to display various stereoscopic images. In further detail, the stereoscopic image display device includes a display panel, a barrier, a barrier driver, and a controller. A stereoscopic image is displayed on the display panel. The barrier is placed corresponding to the display panel, and includes a plurality of liquid crystal cells arranged in a matrix format. The barrier driver drives the barrier such that the barrier display pattern may be a display pattern corresponding to the image signal by controlling the respective plurality of liquid crystal cells to become selectively transparent or opaque based on the mode information signal.

20 Claims, 16 Drawing Sheets

FOREIGN PATENT DOCUMENTS

| | | |
|---|---|---|
| JP | 09-159970 | 6/1997 |
| JP | 9-171156 | 6/1997 |
| JP | 10-142572 | 5/1998 |
| JP | 2001-197523 | 7/2001 |
| JP | 2002-095015 | 3/2002 |
| JP | 2004-297607 | 10/2004 |
| JP | 2005-172925 | 6/2005 |
| KR | 1999-0053446 | 7/1999 |
| KR | 2002-0041382 | 6/2002 |
| KR | 2003-0021293 | 3/2003 |
| KR | 2003-0088244 | 11/2003 |
| WO | WO 00/70882 | 11/2000 |
| WO | WO 02/09442 A1 | 1/2002 |

OTHER PUBLICATIONS

Korean patent abstract for patent publication No. 100274625 B1 dated Sep. 14, 2000 in the name of Geon Ho Cho, et al., which corresponds to Korean publication 1999-0053446 listed above.
Korean patent abstract for publication No. 1020020041382 A dated Jun. 1, 2002 in the name of Seong Jung Lee.
Korean patent abstract for publication No. 1020030021293 A dated Mar. 15, 2003 in the name of Hee Bin Lim.
European Search Report for EP 05110066.7-2202 dated Mar. 1, 2006.
Patent Abstracts of Japan, Publication No. 04-250439; dated Sep. 7, 1992; in the name of Mikio Sakamoto.
Patent Abstracts of Japan, Publication No. 08-327948, dated Dec. 13, 1996, in the name of Takasato Taniguchi.
Patent Abstracts of Japan, Publication No. 09-171156, dated Jun. 30, 1997, in the name of Tetsuya Tateno.
Patent Abstracts of Japan, Publication No. 2002-095015; dated Mar. 29, 2002; in the name of Akihiro Fujiwara et al.
Patent Abstracts of Japan, Publication No. 2005-172925; dated Jun. 30, 2005; in the name of Shiki Takabayashi et al.
Korean Patent Abstracts, Publication No. 1020030088244 A, dated Nov. 19, 2003, in the name of Hyeong Uk Jang, et al.
U.S. Office action dated Mar. 30, 2009, for related U.S. Appl. No. 11/065,212.
European Office action dated Dec. 7, 2011, for corresponding European Patent application 05110066.7, 11 pages.
Office Action dated Nov. 22, 2010 of related U.S. Appl. No. 11/065,212.

* cited by examiner

BARRIER DEVICE AND STEREOSCOPIC IMAGE DISPLAY USING THE SAME

CROSS-REFERENCE TO RELATED APPLICATION

This application claims priority to and the benefit of Korean Patent Application No. 10-2004-0098978 filed in the Korean Intellectual Property Office on Nov. 30, 2004, the entire content of which is incorporated herein by reference.

BACKGROUND OF THE INVENTION

1. Field of the Invention

The present invention relates to a barrier device and a stereoscopic image display device using the barrier device. More particularly, the present invention relates to an active barrier capable of varying display patterns and a stereoscopic image display device using the active barrier.

2. Description of the Related Art

In general, people perceive a stereoscopic effect physiologically and experientially. In three-dimensional image display technology, a stereoscopic effect of an object is produced by using binocular parallax, which is a primary factor in recognizing a stereoscopic effect at a short distance. Stereoscopic images are viewed by a stereoscopic method that involves wearing of spectacles or by an autostereoscopic method that does not involve wearing of spectacles.

The stereoscopic method is classified into an anaglyph method that involves wearing of spectacles having blue and red lenses on respective sides, a polarization method that involves wearing of polarizing spectacles having different polarization directions, and a time-division method that involves wearing of spectacles including an electronic shutter synchronized with intervals by which a frame is repeated time-divisionally. As such, each stereoscopic method requires the inconvenience of wearing the spectacles, and causes difficulty of viewing objects other than the stereoscopic image. Accordingly, the autostereoscopic method that does not involve wearing of spectacles has been actively developed.

Typical autostereoscopic methods include a lenticular method in which a lenticular lens plate having an array of vertically arranged cylindrical lenses is formed in front of an image panel, and a parallax barrier method that separates left-eye and right-eye images using a barrier to obtain a stereoscopic effect.

In general, a barrier having alternately arranged opaque regions and transparent regions is placed in front of an image panel. The image panel includes right-eye pixels viewed by the right eye and left-eye pixels viewed by the left eye.

When an observer sees an image displayed on the image panel through the transparent regions of the barrier, different areas of the displayed image are respectively viewed by the right and left eyes even though they may be viewed through the same transparent region. That is, the stereoscopic effect is produced since the right and left eyes of the observer respectively view different images displayed on pixels neighboring each other through the same transparent regions.

Such a barrier is a two-view parallax barrier having the same width of the opaque and transparent regions, which has a problem in that a horizontal resolution is about a half of a vertical resolution. Recently, display devices capable of rotating its screen between a vertically long portrait screen mode and a horizontally long landscape screen mode have been developed. Specifically, the landscape screen mode is typically used for playing games, watching TV or motion pictures, and using the screen to see wide pictures captured by a built-in digital camera. However, the barrier is manufactured to be suitable for only one of the portrait and landscape modes. Therefore, the stereoscopic images are not available on a screen of the landscape mode when a barrier for the portrait mode is combined with the display device.

A conventional barrier method for displaying a 4-view parallax stereoscopic image is disclosed in U.S. Pat. No. 5,949,390.

In U.S. Pat. No. 5,949,390, respective right-eye images corresponding to each view are displayed on four cells (or pixels) arranged in sequence on a display panel, and a four-view image is viewed by the right eye through a corresponding transparent region. In a like manner, respective left-eye images corresponding to each view are displayed on four cells (or pixels) arranged in sequence on the display panel, and another four-view image is viewed by the left eye through a corresponding transparent region.

In the conventional barrier method described above, the barrier has wider opaque regions than the transparent regions, in order to express a stereoscopic image in a multi-view scheme having a greater number of views than the two-view scheme.

For those reasons, it has been difficult to popularize the stereoscopic image display device. Accordingly, it is highly desirable to develop a barrier that is adaptive to display 3D images in various schemes.

The above information disclosed in this Background section is only for enhancement of understanding of the background of the invention, and therefore it may contain information that does not form the prior art that is already known in this country to a person of ordinary skill in the art.

SUMMARY OF THE INVENTION

One aspect of the present invention is to provide an active barrier for varying a barrier display pattern so as to display various stereoscopic images, and a stereoscopic image display device using the active barrier.

An exemplary stereoscopic image display device according to an embodiment of the present invention includes a display panel, a barrier, a barrier driver, and a controller. The display panel displays an image corresponding to an inputted image signal. The barrier is placed corresponding to the display panel, and includes a plurality of liquid crystal cells. The barrier driver drives the barrier such that the respective liquid crystal cells of the barrier selectively become transparent or opaque. The controller controls the barrier driver.

The plurality of liquid crystal cells may be arranged in first and second directions in a matrix format. The barrier driver may include a memory for storing barrier driving signal data corresponding to signals inputted from the controller, a first driver for generating a first direction driving signal based on the barrier driving signal data and applying it to the barrier, and a second driver for generating a second direction driving signal based on the barrier driving signal data and applying it to the barrier.

In a further embodiment, an exemplary barrier device used for a stereoscopic image display device for displaying a stereoscopic image by using binocular parallax includes a barrier, a barrier driver, and a controller. The barrier is placed corresponding to a display panel and includes a plurality of liquid crystal cells. The barrier driver drives the barrier such that the respective plurality of liquid crystal cells of the barrier selectively become transparent or opaque. The controller selects a display pattern of the barrier and outputs a control signal corresponding to the display pattern of the barrier to the barrier driver. The barrier driver includes a memory for storing barrier driving signal data corresponding to the control signal, a first driver for generating a first direction driving signal based on the barrier driving signal data and applying it to the barrier, and a second driver for generating a second direction driving signal based on the barrier driving signal data and applying it to the barrier.

In an exemplary driving method of a stereoscopic display device including a display panel for displaying an image corresponding to an inputted image signal and a barrier placed corresponding to the display panel, for the barrier having a plurality of liquid crystal cells arranged in a matrix format according to another further embodiment of the present invention, a barrier control signal is generated based on the inputted image signal, the barrier is driven such that the barrier display pattern becomes a display pattern corresponding to the image signal by controlling the respective plurality of liquid crystal cells to be selectively transparent or opaque based on the barrier control signal, and the image corresponding to the image signal is displayed on the display panel.

In a still further embodiment, an exemplary stereoscopic image display device includes a display panel, a barrier, a barrier driver, a controller, and a mode detector. The display panel is adapted to be rotated to convert a display mode and displays an image corresponding to an inputted image signal. The barrier is placed corresponding to the display panel, and includes a plurality of liquid crystal cells. The barrier driver drives the barrier such that the respective liquid crystal cells of the barrier selectively become transparent or opaque. The controller generates a barrier control signal for controlling the barrier driver. The mode detector detects the display mode of the display panel and applies information on the display mode of the display panel to the controller to generate a mode information signal.

The plurality of liquid crystal cells may be arranged in first and second directions in a matrix format. The barrier driver may include a memory for storing barrier driving signal data for portrait and landscape modes corresponding to the barrier control signal inputted from the controller, a first driver for applying a row direction driving signal to the barrier after generating the first direction driving signal based on the barrier driving signal data, and a second driver for applying a column direction driving signal to the barrier after generating the second direction driving signal based on the barrier driving signal data.

The controller may generate the barrier control signal based on the inputted image signal, and the memory may store the barrier driving signal data for a barrier display pattern corresponding to the barrier control signal based on the image signal.

In another exemplary driving method of a stereoscopic display device including a display panel adapted to be rotated to convert a display mode and for displaying an image corresponding to an inputted image signal, and a barrier placed corresponding to the display panel, the barrier having a plurality of liquid crystal cells arranged in a matrix format, a mode information signal is generated by detecting the display mode of the display panel, the barrier is driven such that the barrier display pattern is a display pattern corresponding to the image signal by controlling the respective plurality of liquid crystal cells to be selectively transparent or opaque based on the mode information signal, and the image corresponding to the image signal is displayed on the display panel.

The display mode of the display panel may include at least one of portrait and landscape modes.

DETAILED DESCRIPTION OF THE EMBODIMENTS

Figure 1:
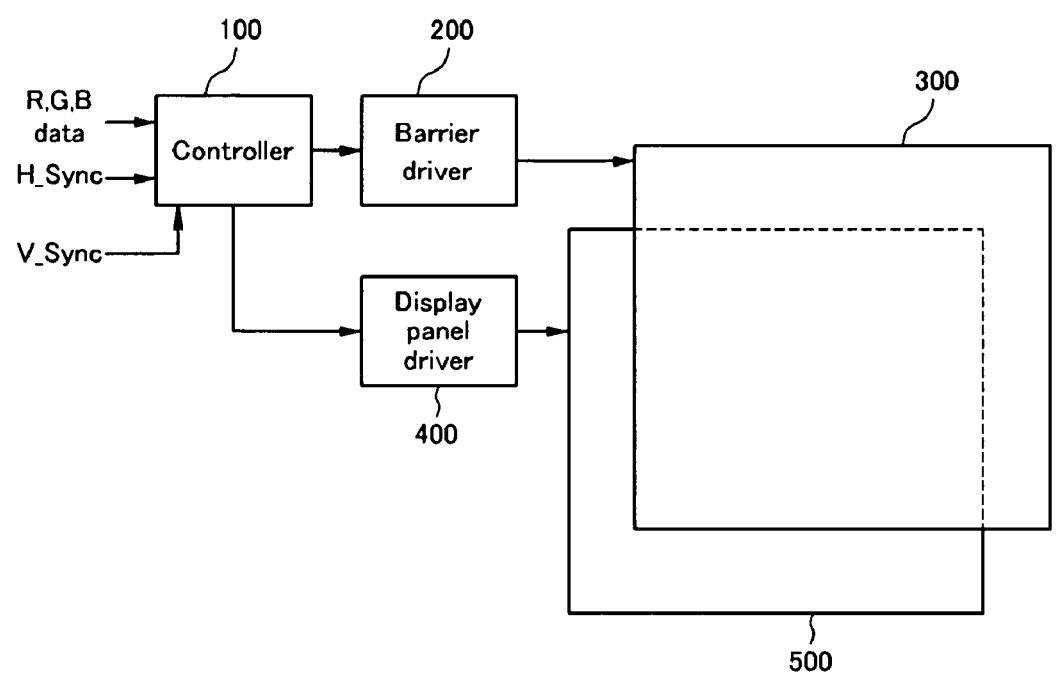
FIG. 1 shows a schematic block diagram of a configuration of a stereoscopic image display device according to a first exemplary embodiment of the present invention.

Certain exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a schematic block diagram of a configuration of a stereoscopic image display device according to a first exemplary embodiment of the present invention.

The stereoscopic image display device includes a controller 100, a barrier driver 200, a barrier 300, a display panel driver 400, and a display panel 500.

The controller 100 generates a barrier control signal and a display panel control signal and respectively transmits them to the barrier driver 200 and the display panel driver 400 after receiving an image signal (R, G, and B data), a horizontal synchronization signal (H_sync), and a vertical synchronization signal (V_sync). The controller 100 determines display patterns of the display panel 500 and the barrier 300 based on the inputted image signal (R, G, and B data) and/or a user's choice, and respectively transmits the determined display patterns to the barrier driver 200 and the display panel driver 400. That is, the controller 100 determines whether the inputted image signal (R, G, and B data) is a 2D signal, a 3D signal, a 2-view 3D image signal, or a multi-view 3D image signal, and respectively transmits the control signals to the display panel driver 400 and the barrier driver 200 so as to drive the display panel 500 and the barrier 300 according to the inputted image signal.

The barrier driver 200 drives the barrier 300 using the control signal received from the controller 100. In further detail, the barrier driver 200 drives the barrier 300 such that the barrier 300 may form one of a striped pattern, a chessboard pattern, a stair pattern, and a multi-view pattern, based on the display pattern of the barrier determined by the controller 100.

The display panel driver 400 drives the display panel 500 using the control signal received from the controller 100. In further detail, the display panel driver 400 drives the display panel 500 so as to normally display the inputted image signal (R, G, and B data) on the display panel 500.

Figure 2A:
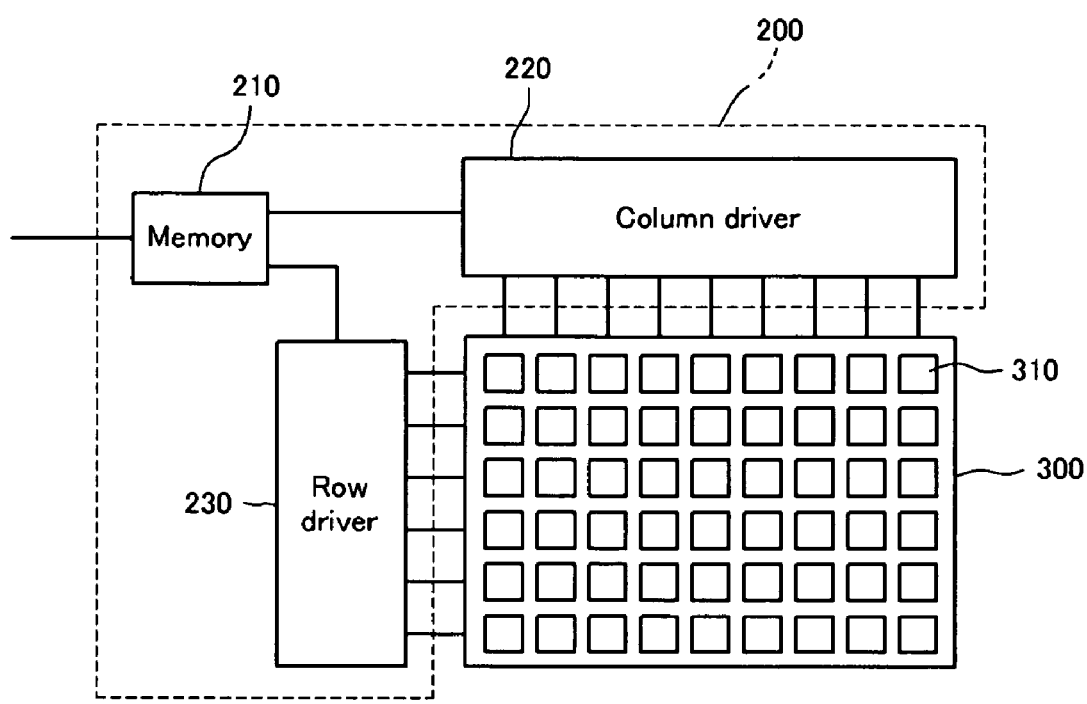
FIG. 2A shows a schematic block diagram of a configuration of a barrier driver and a barrier.

FIG. 2A shows a schematic block diagram of a configuration of the barrier driver 200 and the barrier 300.

The barrier driver 200 includes a memory 210, a column driver 220, and a row driver 230. The barrier 300 includes a plurality of liquid crystal cells 310 arranged in a matrix format.

The memory 210 stores driving signal data corresponding to display patterns so as to drive the barrier 300 according to the display patterns in response to the control signal transmitted from the controller 100, determines a display pattern based on the control signal transmitted from the controller 100, and respectively outputs the driving signal data corresponding to the display patterns to the column driver 220 and row driver 230.

The column driver 220 and the row driver 230 drive the barrier 300 such that the barrier display pattern may be a display pattern determined by the controller 100 by controlling the respective plurality of liquid crystal cells to be selectively transparent cells or opaque cells based on the driving signal data provided by the memory 210. That is, the column driver 220 and the row driver 230 selectively apply respective driving signals (e.g., voltages) to columns and rows to form the display pattern of the barrier.

That is, the barrier driver 200 controls the plurality of liquid crystal cells to respectively be the opaque or transparent cells, and the opaque and transparent cells form respective opaque and transparent regions. A barrier pitch which is a gap between neighboring transparent regions or opaque regions may be formed by the plurality of liquid crystal cells 310. In addition, the barrier 300 may be formed in an active matrix type in which the liquid crystal cell 310 includes a thin film transistor (TFT) and a storage capacitor, or in a passive matrix type in which the liquid crystal cell is formed at crossing parts of column and row electrodes. Accordingly, the barrier 300 may be driven in a driving method of a conventional TFT liquid crystal display device when the barrier 300 is formed in the active matrix, and be driven in a driving method of a conventional passive matrix liquid crystal display device when the barrier 300 is formed in the passive matrix.

As described, the barrier according to the exemplary embodiment of the present invention is a barrier capable of varying the display patterns of the barrier since the liquid crystal cells 310 of the barrier 300 respectively become opaque cells or transparent cells in response to the driving signal based on the display patterns determined by the controller 100. Hereinafter, the barrier according to the exemplary embodiment of the present invention will be referred to as an "active barrier."

Figure 2B:
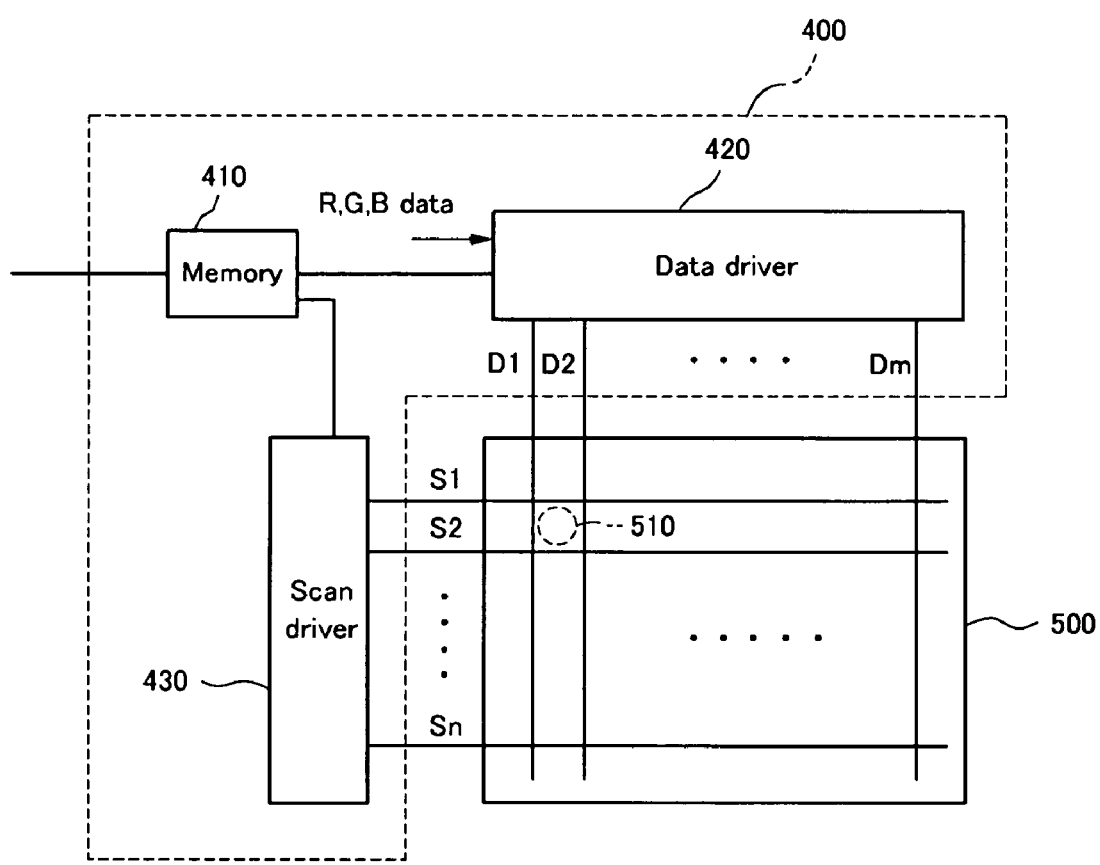
FIG. 2B shows a schematic block diagram of a configuration of a display panel driver and a display panel.

FIG. 2B shows a schematic block diagram of a configuration of the display panel driver 400 and the display panel 500.

The display panel driver 400 includes a memory 410, a data driver 420, and a scan driver 430.

The memory 410 stores driving signal data corresponding to display patterns, receives the display patterns from the controller 100, and respectively outputs the driving signal data corresponding to the received display patterns to the data driver 420 and the scan driver 430. The data driver 420 respectively applies data signals to data lines D1 to Dm after generating the data signals based on the image signal (R, G, and B data). The scan driver 430 sequentially applies selection signals to respective scan lines S1 to Sn after sequentially generating the selection signals.

The display panel 500 includes a plurality of liquid crystal cells 510 formed at crossing parts of the data and scan lines D1-Dm and S1-Sn. While the liquid crystal display device is used for the display panel in the first exemplary embodiment of the present invention, the display panel in other embodiments may include one or more of various display panels such as a plasma display panel, an organic light emitting diode display, and a cathode ray tube.

A pixel arrangement of the display panel 500 should be controlled according to a barrier configuration in order to use the active barrier. When a stereoscopic image is to be displayed in the striped pattern, the active barrier is driven according to information on a configuration for the striped barrier pattern stored in the memory 210, and the image data are mapped according to information on a pixel arrangement since the memory 410 storing the information on the pixel arrangement of the display panel for the striped pattern is activated. Therefore the stereoscopic image is finally displayed on a screen.

As described, when the active barrier is used, one barrier pitch may include a plurality of liquid crystal cells, the barrier may be formed in one of the striped, chessboard, stair, and zigzag patterns, and stereoscopic image display may be manufactured by controlling the pixel arrangement to be in the striped and chessboard patterns in both of the portrait and landscape mode screens. In addition, two-view and multi-view display systems may be formed by using one active barrier.

FIGS. 3A, 3B, 3C and 3D show diagrams for exemplifying types of patterns for the active barrier according to a first exemplary embodiment of the present invention. In FIG. 3A to FIG. 3D, opaque regions are illustrated in black, and transparent regions are illustrated in white.

Figure 3A:
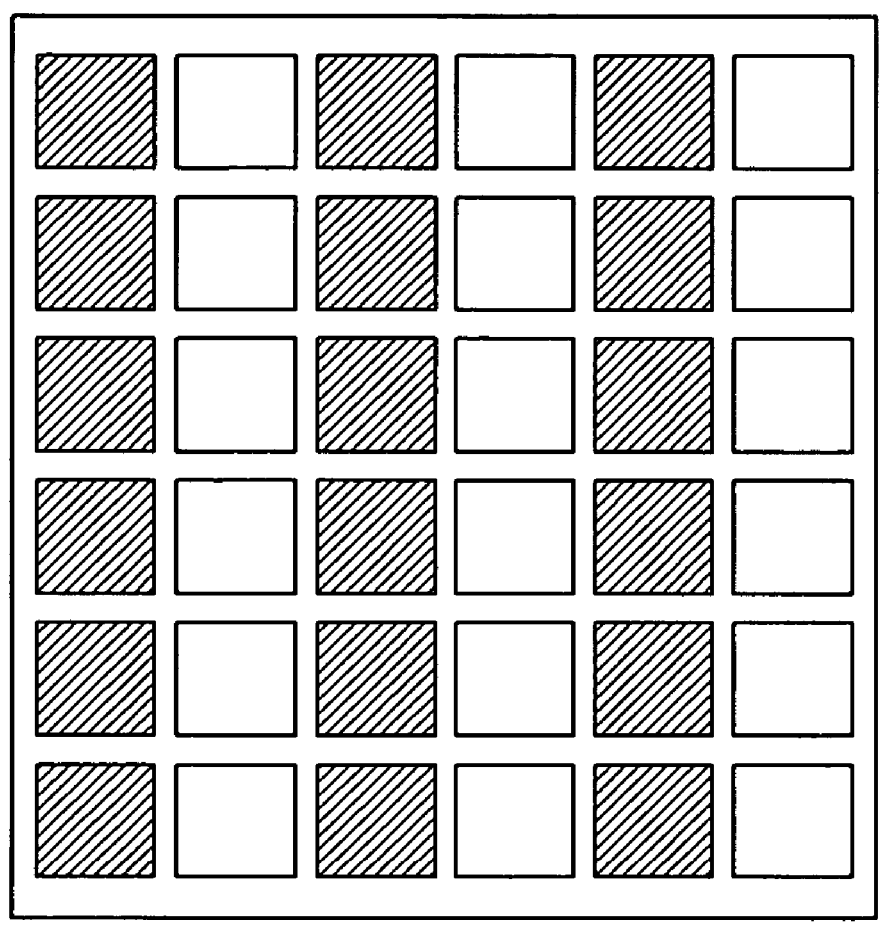
FIG. 3A to FIG. 3D show diagrams for exemplifying types of the active barrier according to the first exemplary embodiment of the present invention.
Figure 3B:
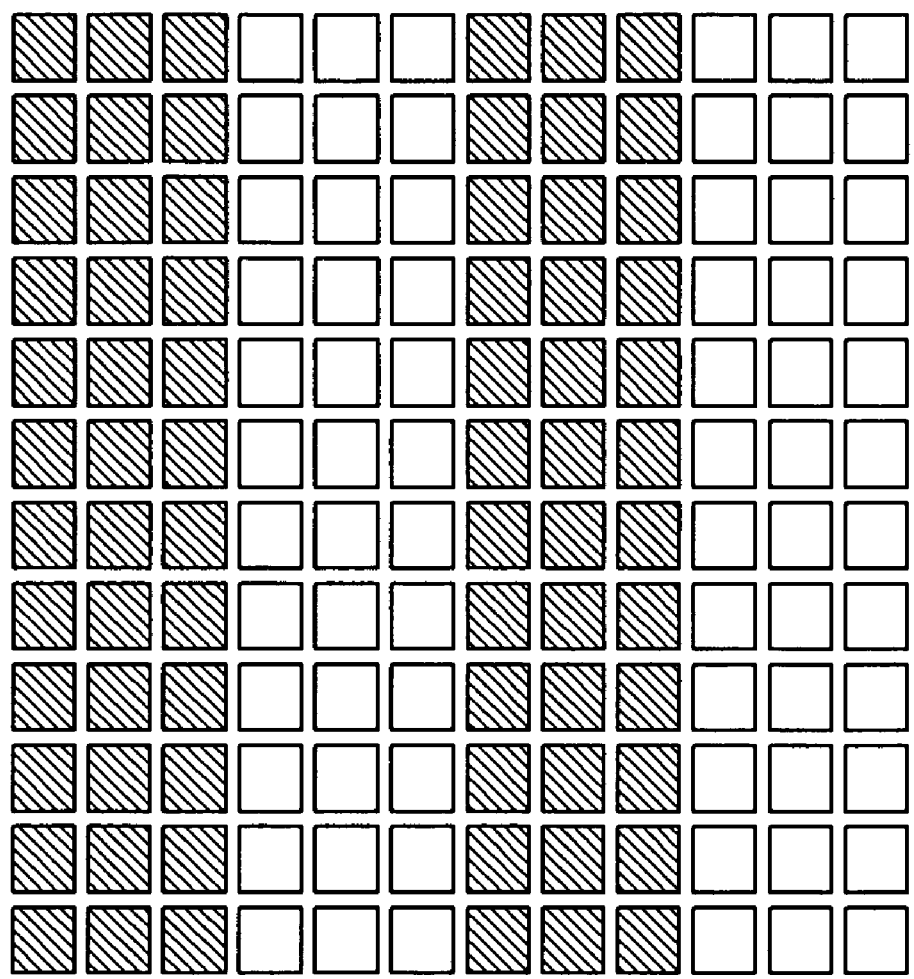

FIG. 3A shows a diagram for representing a two-view parallax barrier corresponding to the conventional striped pattern, and FIG. 3B shows a diagram for representing a two-view parallax barrier in which the opaque region and the transparent region are wider than those of the barrier shown in FIG. 3A. As shown in FIG. 3B, the width of the opaque region and the transparent region may be controlled even in the stripe pattern according to a cell pitch of the liquid crystal cells 310 formed in the barrier 300.

Figure 3C:
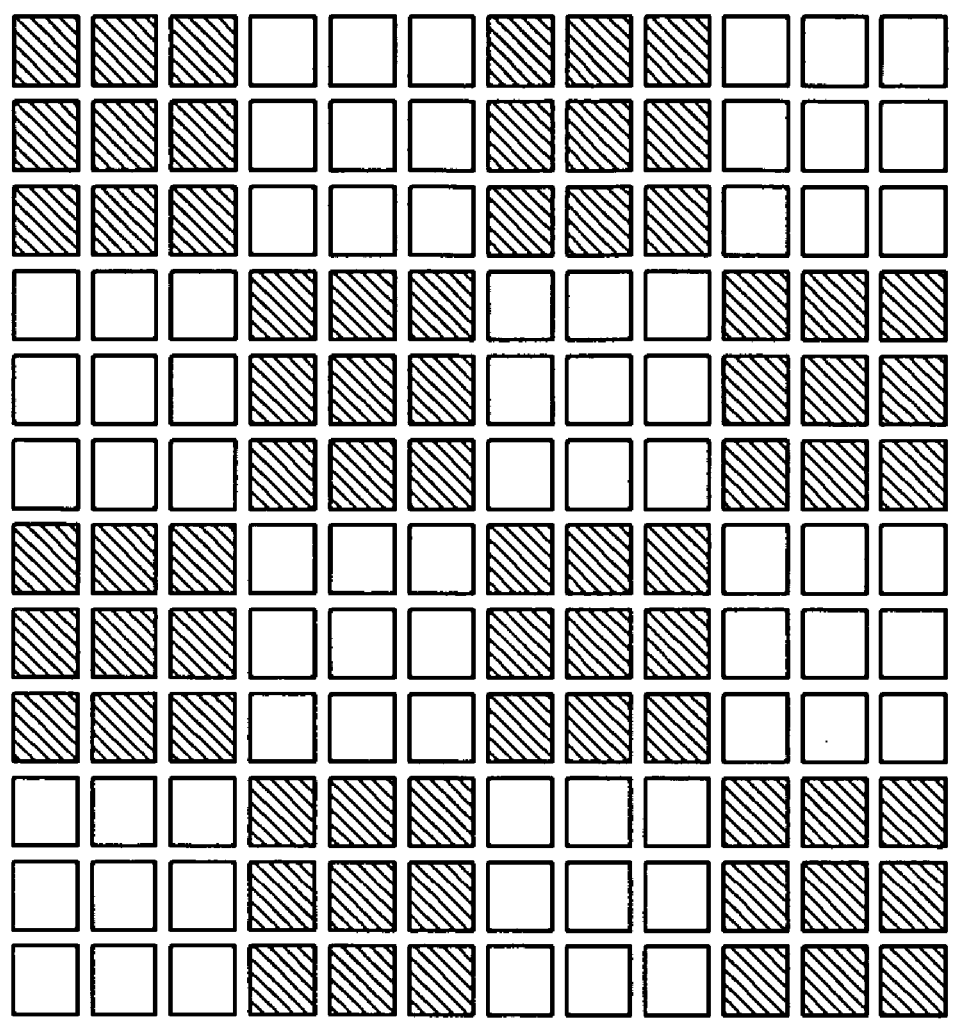
Figure 3D:
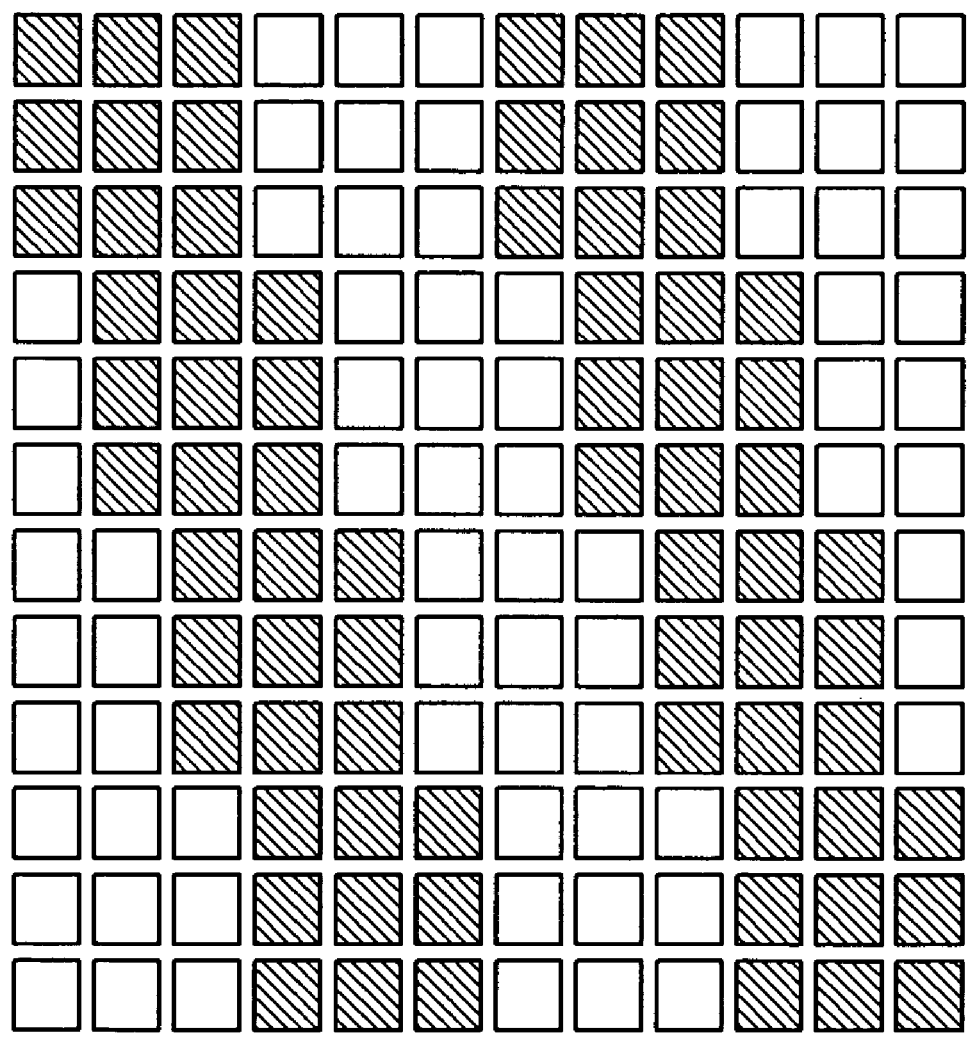

FIG. 3C shows a diagram of a chessboard type of barrier for preventing vertical stripes of a display image from occurring such as on the stripe patterned barrier. In a like manner as in FIG. 3B, the chessboard pattern may be resized according to the cell pitch of the liquid crystal cells 310 in FIG. 3C. FIG. 3D shows a diagram of a stair pattern of barrier.

Figure 4A:
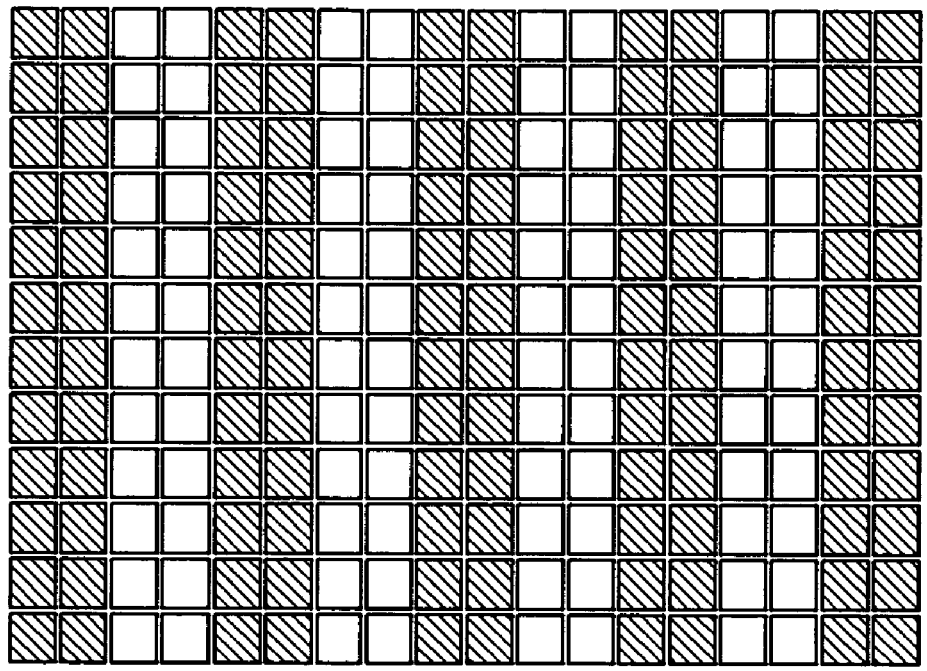
FIG. 4A and FIG. 4B respectively show diagrams for respectively representing a two-view parallax,barrier and a multi-view parallax barrier.
Figure 4B:
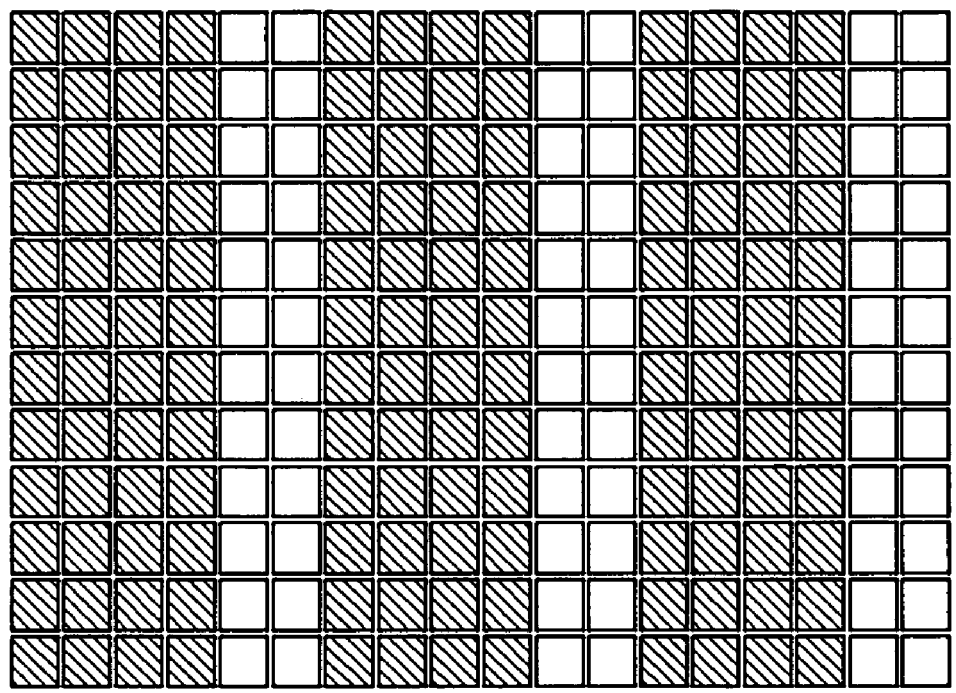

FIG. 4A and FIG. 4B respectively show diagrams for representing a two-view parallax barrier and a multi-view parallax barrier. The exemplary barrier of the present invention may be more widely used since various types of the barrier may be realized.

In addition, mobile displays for rotating a screen between a vertically long portrait mode for normal use and a horizontally long landscape mode have been recently developed. By way of example, the landscape mode is typically used for playing games, watching TV or motion pictures, and using the screen to see wide pictures captured by a built-in digital camera. Accordingly, it is desirable to develop stereoscopic image display devices that allow for rotating the screen.

A second exemplary embodiment of the present invention will be described with reference to FIG. 5, FIG. 6A, FIG. 6B, FIG. 7A, FIG. 7B, FIG. 8A and FIG. 8B.

Figure 5:
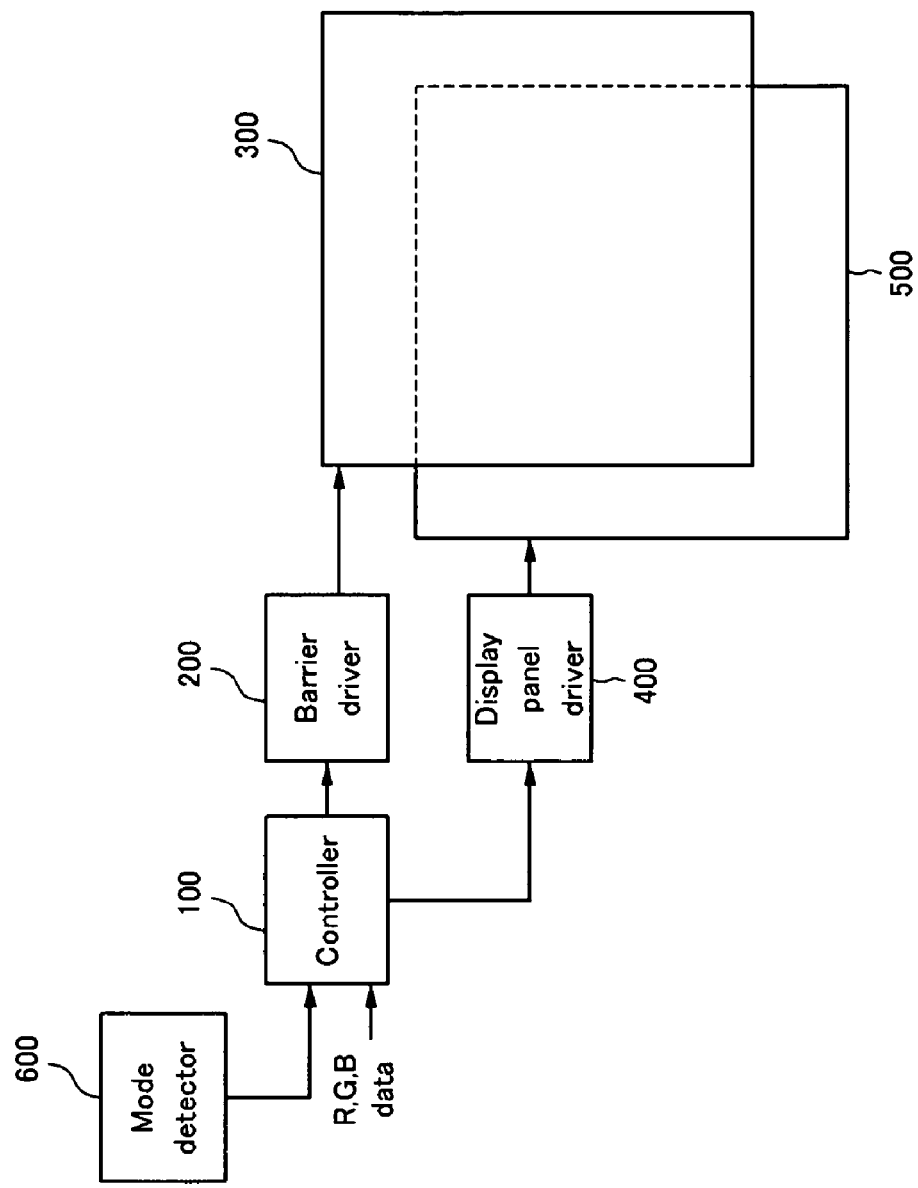
FIG. 5 shows a schematic block diagram of a configuration of a stereoscopic image display device according to a second exemplary embodiment of the present invention.

FIG. 5 shows a schematic block diagram of a configuration of a stereoscopic image display device according to a second exemplary embodiment of the present invention.

As shown in FIG. 5, the stereoscopic image display device includes a controller 100, a barrier driver 200, a barrier 300, a display panel driver 400, a display panel 500, and a mode detector 600.

As such, the second exemplary embodiment of the present invention further includes the mode detector 600, which makes it different from the first exemplary embodiment of the present invention. Since configurations and operations of the controller 100, the barrier driver 200, the barrier 300, the display panel driver 400, and the display panel 500 are the same as those of the first exemplary embodiment, further detailed descriptions will be omitted, and accordingly, it will be described with focus on the mode detector 600.

The mode detector 600 detects a display mode of the display panel 500 and applies a mode information signal to the controller 100 when the display panel 500 is rotated by 90 degrees or by 180 degrees. Accordingly, the controller 100 respectively controls the display panel driver 400 and the barrier driver 200 so as to display an image signal corresponding to the display mode on the display panel 500 based on the applied mode information signal. In further detail, the controller 100 transmits a driving signal to the display panel driver 400 so as to normally display the image signal on the display panel 500 based on the display mode information signal having information on whether the display panel 500 is in the portrait mode or the landscape mode. The controller 100 also transmits another driving signal to the barrier driver 200 so as to display a stereoscopic image corresponding to the display mode on the display panel 500.

Figure 6A:
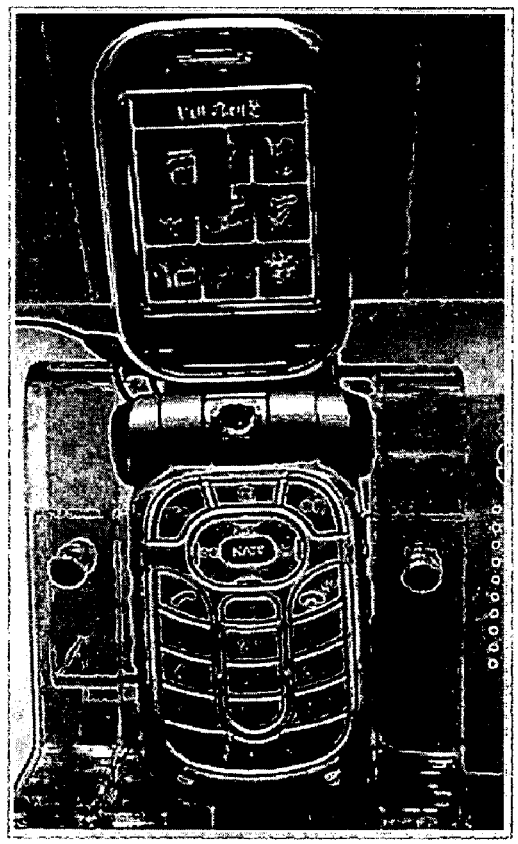
FIG. 6A and FIG. 6B respectively show diagrams for representing barriers when a display screen is in portrait and landscape modes.
Figure 6A:
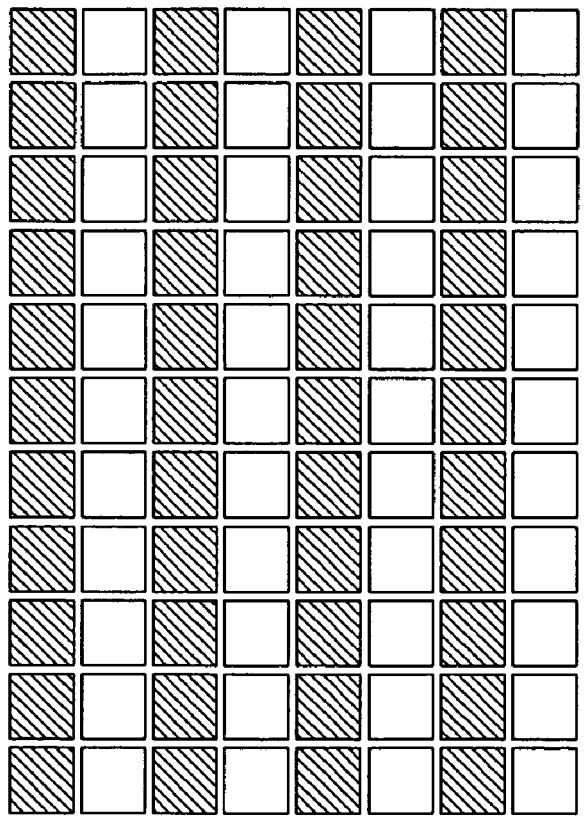
Figure 6B:
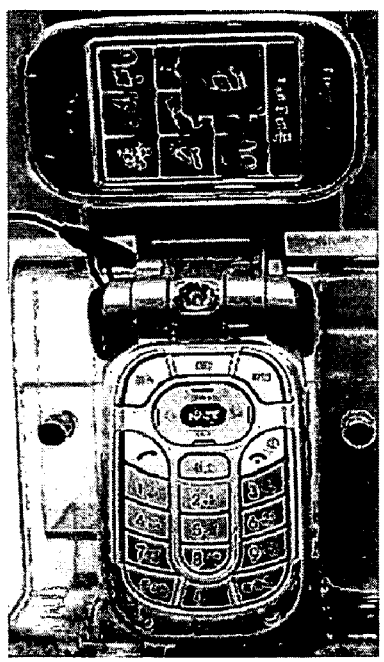
Figure 6B:
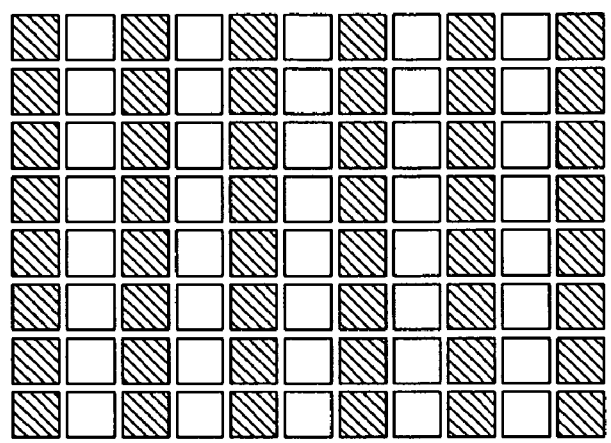

FIG. 6A and FIG. 6B respectively show diagrams for representing barrier types when a display screen is respectively in the portrait and landscape modes.

The barrier may be in a display pattern corresponding to the portrait mode screen as shown in FIG. 6A, or it may be converted into a display pattern corresponding to the display screen which is rotated by 90 degrees as the landscape mode screen.

In a case of the conventional barrier in which the transparent region and the opaque region are fixed, the stereoscopic image is observed since the left and right eye images are horizontally separated by the barrier according to directions of the left and right eyes when the display screen is in the portrait mode, but when the display screen is rotated by 90 degrees to become the landscape mode screen, the stereoscopic image is not observed since the left and right eye images are not horizontally separated. However, using the active barrier according to the exemplary embodiment of the present invention, the stereoscopic image is observed since the barrier type is converted such that the left and right eye images may be horizontally separated when the display screen is in the landscape mode.

Figure 7A:
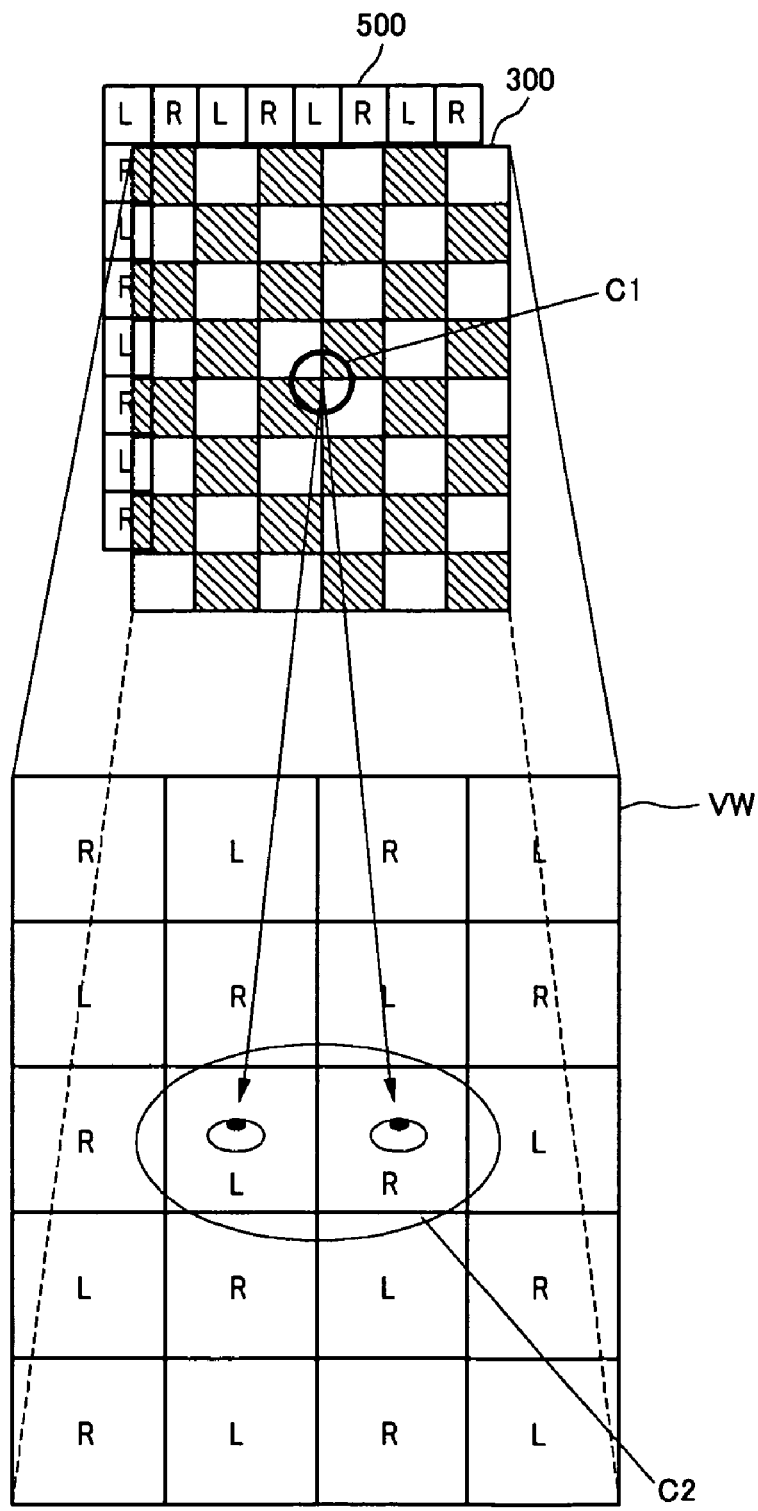
FIG. 7A and FIG. 7B respectively show diagrams for representing a center C1 of a screen and a center C2 of a viewing position when the barrier is a chessboard type in cases of the portrait and landscape mode screens.
Figure 7B:
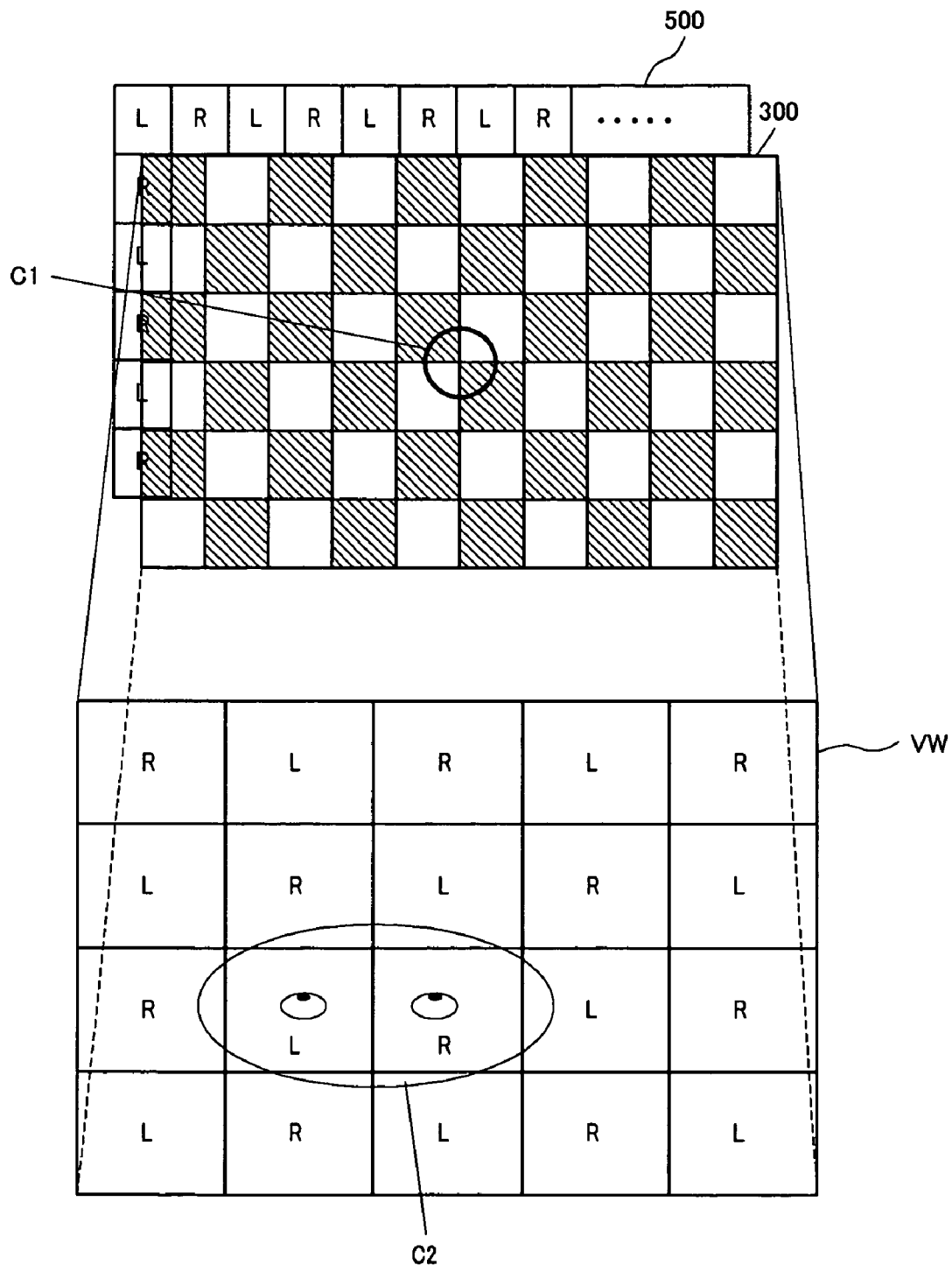

FIG. 7A and FIG. 7B respectively show diagrams for representing a center C1 of a screen and a center C2 of a viewing position when the barrier is a chessboard pattern in cases of the portrait and landscape mode screens.

In a case of the chessboard pattern of barrier, while the stereoscopic image may be observed both in the portrait and landscape mode screens, a viewing position C2 fixed to the center C1 of the screen may problematically be changed when the display screen is rotated from the portrait to the landscape mode screen.

As shown in FIG. 7A, assuming that there is a virtual viewing window VW at an appropriate viewing distance from the display screen of the stereoscopic image display, an optimum viewing position is set on a center of the virtual viewing window VW when the display screen is in the portrait mode. However, as shown in FIG. 7B, the viewing position is deviated from the center of the virtual viewing window VW when the display screen is rotated by 90 degrees about the center C1 of the display screen.

That is, when the stereoscopic image display is observed through a barrier having a chessboard pattern, the stereoscopic image is observed from a viewing position aligned with the center of the virtual viewing window VW in a case of the portrait mode screen, but when the display screen is rotated by 90 degrees to view the landscape mode screen, the stereoscopic image may be observed at a viewing position not aligned with the center of the virtual viewing window VW, such that an observer may observe the stereoscopic image by moving the viewing position (i.e., by moving the head and/or eyes) away from the center, thereby causing inconvenience to the observer. However, this is solved by using the active barrier according to the exemplary embodiment of the present invention.

Figure 8A:
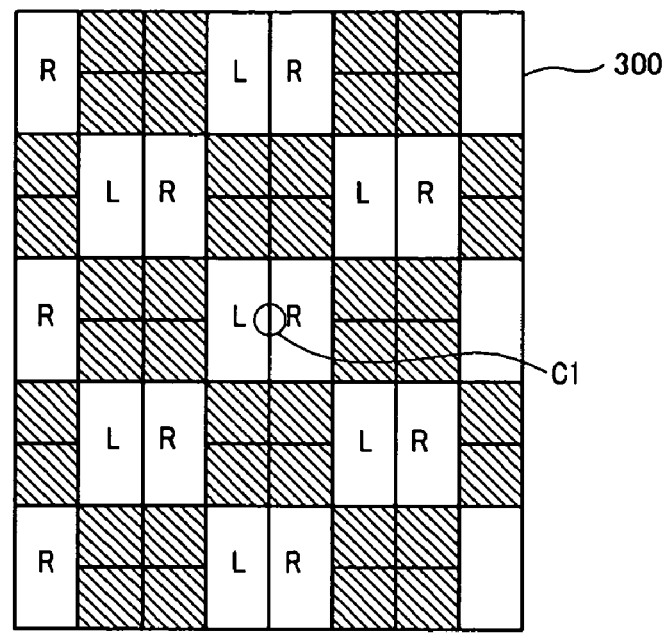
FIG. 8A and FIG. 8B respectively show diagrams for representing a center C1 of a screen and a center C2 of a viewing position when an active barrier according to a second exemplary embodiment of the present invention is in the portrait and landscape modes.
Figure 8A:
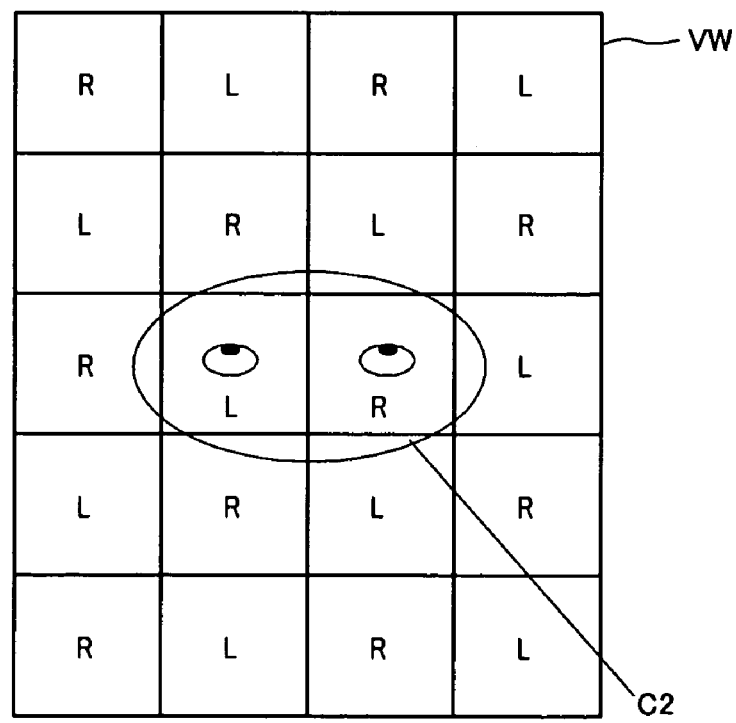
Figure 8B:
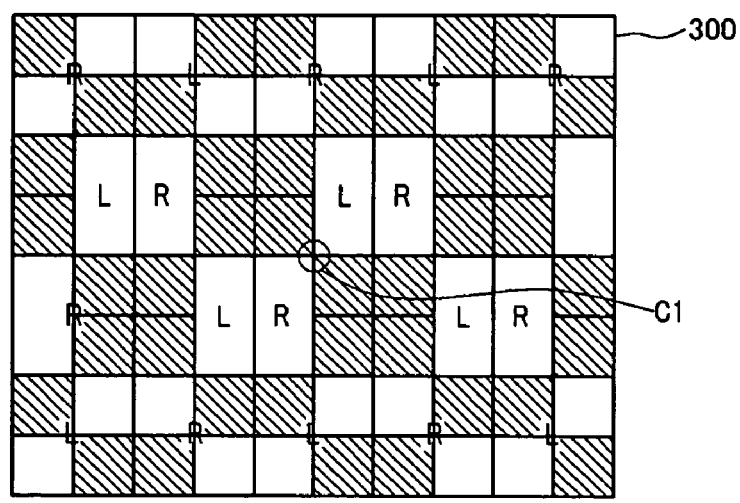
Figure 8B:
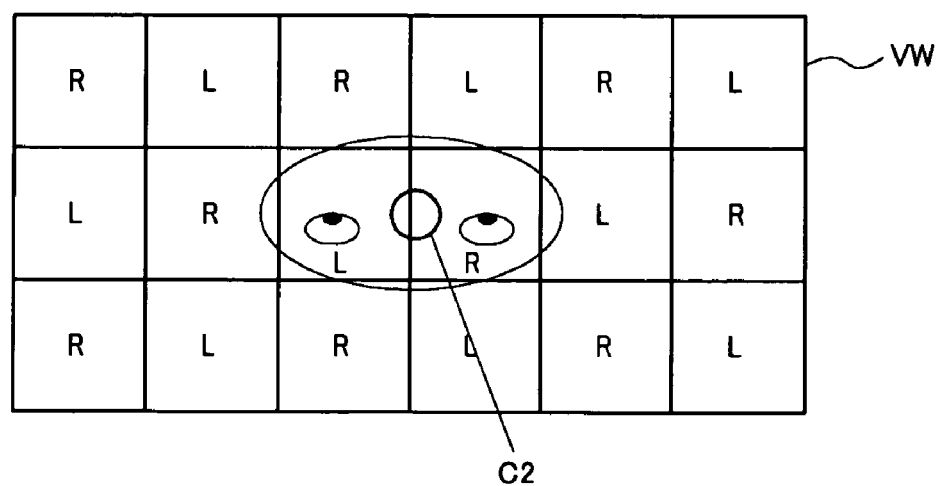

FIG. 8A and FIG. 8B respectively show diagrams for representing the center C1 of a screen and a center C2 of a viewing position when an active barrier according to another exemplary embodiment of the present invention is in the portrait and landscape modes.

When an arrangement of the opaque and transparent cells are controlled by using the active barrier, the arrangement of the opaque and transparent cells corresponds to an arrangement of the image pixels and the viewing position corresponds to the center of the virtual viewing window VW in the case of the landscape mode screen. At this time, the viewing position is deviated from the center of the virtual viewing window VW by a half of the image pixel pitch to the left and downward. However, the viewing position is almost on the center of the virtual viewing window since the half of the image pixel pitch is generally about several tens of μm. Accordingly, the stereoscopic image may be observed without moving the observing position in the case of the landscape mode screen.

According to the exemplary embodiment of the present invention, various barrier configurations such the striped, chessboard, stair, and zigzag patterns may be realized by using one active barrier. In addition, the stereoscopic image may be observed on both the portrait and landscape mode screens without moving the observing position when the active barrier in the striped or the chessboard pattern is applied to mobile stereoscopic display devices.

Also, the two-view and multi-view stereoscopic image may be displayed by using the active barrier.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A stereoscopic display device comprising:
a display panel for displaying a stereoscopic image corresponding to an inputted image signal, the display panel configured to provide at least two stereoscopic display modes corresponding to at least two different orientations for displaying the stereoscopic image;
a barrier placed corresponding to the display panel and comprising a plurality of liquid crystal cells;
a barrier driver for driving the barrier such that the respective liquid crystal cells of the barrier selectively become transparent or opaque; and
a controller for controlling the barrier driver in accordance with the at least two stereoscopic display modes,
wherein the barrier driver is configured to arrange transparent and opaque cells of the liquid crystal cells corresponding to an arrangement of a plurality of image pixels of the display panel, and a viewing position of the stereoscopic image corresponds to a center of a virtual viewing window of the stereoscopic display device in each of the at least two stereoscopic display modes.

2. The stereoscopic display device of claim 1, wherein the plurality of liquid crystal cells are arranged in first and second directions in a matrix format, and the barrier driver comprises:
a memory for storing barrier driving signal data corresponding to signals inputted from the controller;
a first driver for generating a first direction driving signal based on the barrier driving signal data and applying it to the barrier; and
a second driver for generating a second direction driving signal based on the barrier driving signal data and applying it to the barrier.

3. The stereoscopic display device of claim 2, wherein the memory stores at least one barrier driving signal data corresponding to at least one of striped, chessboard, stair, and multi-view patterns.

4. The stereoscopic display device of claim 1, wherein a barrier pitch which is a gap between neighboring transparent regions or between neighboring opaque regions is formed corresponding to the plurality of liquid crystal cells in the barrier.

5. The stereoscopic display device of claim 1, further comprising a display panel driver for driving the display panel according to a barrier display pattern.

6. The stereoscopic display device of claim 1, wherein the display panel is adapted to be rotated to convert between the at least two stereoscopic display modes, and the controller generates a barrier control signal for controlling the barrier driver, the stereoscopic display device further comprising a mode detector for detecting a display mode of the at least two stereoscopic display modes of the display panel and applying information on the display mode of the display panel to the controller to generate a mode information signal.

7. The stereoscopic display device of claim 6, wherein the plurality of liquid crystal cells are arranged in first and second directions in a matrix format, and the barrier driver comprises:
a memory for storing barrier driving signal data for portrait and landscape modes corresponding to the barrier control signal inputted from the controller;
a first driver for applying a row direction driving signal to the barrier after generating the row direction driving signal based on the barrier driving signal data; and
a second driver for applying a column direction driving signal to the barrier after generating the column direction driving signal based on the barrier driving signal data.

8. The stereoscopic display device of claim 7, wherein:
the controller generates the barrier control signal based on the inputted image signal; and
the memory stores the barrier driving signal data for a barrier display pattern corresponding to the barrier control signal based on the image signal.

9. The stereoscopic display device of claim 8, wherein the image signal comprises a stereoscopic image signal having a multi-view comprising two or more views.

10. The stereoscopic display device of claim 8, wherein the barrier display pattern corresponding to the barrier control signal based on the image signal is at least one of stripe, chessboard, and multi-view display patterns.

11. A barrier device for a stereoscopic display device for displaying a stereoscopic image by using binocular parallax, a display panel of the stereoscopic display device configured to provide at least two stereoscopic display modes corresponding to at least two different orientations for displaying the stereoscopic image, the barrier device comprising:
a barrier placed corresponding to the display panel and comprising a plurality of liquid crystal cells;
a barrier driver for driving the barrier such that the respective plurality of liquid crystal cells of the barrier selectively become transparent or opaque; and
a controller for selecting a display pattern of the barrier in accordance with the at least two stereoscopic display modes, and outputting a control signal corresponding to the display pattern of the barrier to the barrier driver,
wherein the barrier driver is configured to arrange transparent and opaque cells of the liquid crystal cells corresponding to an arrangement of a plurality of image pixels of the display panel, and a viewing position of the stereoscopic image corresponds to a center of a virtual viewing window of the stereoscopic display device in each of the at least two stereoscopic display modes,
wherein the barrier driver comprises:
a memory for storing barrier driving signal data corresponding to the control signal;
a first driver for generating a first direction driving signal based on the barrier driving signal data and applying it to the barrier; and
a second driver for generating a second direction driving signal based on the barrier driving signal data and applying it to the barrier.

12. The barrier device of claim 11, wherein the memory stores at least one barrier driving signal data corresponding to at least one of striped, chessboard, stair, and multi-view patterns.

13. A driving method of a stereoscopic display device comprising a display panel for displaying a stereoscopic image corresponding to an inputted image signal and a barrier placed corresponding to the display panel, the display panel configured to provide at least two stereoscopic display modes corresponding to at least two different orientations for displaying the stereoscopic image, the barrier having a plurality of liquid crystal cells arranged in a matrix format, the method comprising:
generating a barrier control signal based on the inputted image signal;
driving the barrier in accordance with the at least two stereoscopic display modes such that a barrier display pattern corresponds to the image signal by controlling the respective plurality of liquid crystal cells to be selectively transparent or opaque based on the barrier control signal;

displaying the stereoscopic image corresponding to the image signal on the display panel; and arranging opaque and transparent cells of the liquid crystal cells corresponding to an arrangement of a plurality of image pixels of the display panel, wherein a viewing position of the stereoscopic image corresponds to a center of a virtual viewing window of the stereoscopic display device in each of the at least two stereoscopic display modes.

14. The driving method of claim 13, wherein the image signal comprises a stereoscopic image signal having a multi-view comprising two or more views.

15. A driving method of a stereoscopic display device comprising a display panel adapted to be rotated to convert between at least two stereoscopic display modes corresponding to at least two different orientations for displaying a stereoscopic image corresponding to an inputted image signal, and a barrier placed corresponding to the display panel, the barrier having a plurality of liquid crystal cells arranged in a matrix format, the method comprising:

generating a mode information signal by detecting a display mode of the at least two stereoscopic display modes of the display panel;

driving the barrier such that a barrier display pattern corresponds to the image signal by controlling the respective plurality of liquid crystal cells to be selectively transparent or opaque based on the mode information signal;

displaying the stereoscopic image corresponding to the image signal on the display panel; and arranging opaque and transparent cells of the liquid crystal cells corresponding to an arrangement of a plurality of image pixels of the display panel, wherein a viewing position of the stereoscopic image corresponds to a center of a virtual viewing window of the stereoscopic display device in each of the at least two stereoscopic display modes.

16. The driving method of claim 15, wherein the at least two stereoscopic display modes of the display panel comprise portrait and landscape modes.

17. The driving method of claim 15, further comprising, when the mode information signal is generated by detecting the display mode of the display panel, generating a barrier control signal based on the inputted image signal.

18. The driving method of claim 17, wherein, when the barrier is driven such that the barrier display pattern corresponds to the image signal by controlling the respective plurality of liquid crystal cells to become selectively transparent or opaque based on the mode information signal, the barrier is controlled to be in the barrier display pattern corresponding to the image signal based on the barrier control signal.

19. The driving method of claim 15, wherein the barrier display pattern has wider opaque regions than transparent regions in correspondence with the stereoscopic image comprising a multi-view image.

20. The driving method of claim 15, wherein the display panel comprises a liquid crystal display, plasma display panel, organic light emitting diode display or a cathode ray tube.

* * * * *

UNITED STATES PATENT AND TRADEMARK OFFICE
CERTIFICATE OF CORRECTION

PATENT NO. : 8,373,617 B2  
APPLICATION NO. : 11/274831  
DATED : February 12, 2013  
INVENTOR(S) : Beom-Shik Kim et al.

Page 1 of 1

It is certified that error appears in the above-identified patent and that said Letters Patent is hereby corrected as shown below:

On the Title Page

(56) References Cited, OTHER PUBLICATIONS, page 2, right column

Delete "Mar. 1, 2006."  
Insert -- Jan. 3, 2006. --

Signed and Sealed this  
Fourteenth Day of October, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,373,617 B2 | Page 1 of 1 |
| APPLICATION NO. | : 11/274831 | |
| DATED | : February 12, 2013 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this
Eleventh Day of November, 2014

Michelle K. Lee
*Deputy Director of the United States Patent and Trademark Office*